US008894026B2

(12) United States Patent　　(10) Patent No.: US 8,894,026 B2
Lin　　(45) Date of Patent: Nov. 25, 2014

(54) FIXING DEVICE

(71) Applicant: Mu-Sheng Lin, Taipei (TW)

(72) Inventor: Mu-Sheng Lin, Taipei (TW)

( * ) Notice: Subject to any disclaimer, the term of this patent is extended or adjusted under 35 U.S.C. 154(b) by 0 days.

(21) Appl. No.: 13/645,410

(22) Filed: Oct. 4, 2012

(65) Prior Publication Data

US 2013/0126699 A1　　May 23, 2013

(30) Foreign Application Priority Data

Nov. 18, 2011　(TW) .............................. 100221881 U

(51) Int. Cl.
　　*A45D 42/14*　(2006.01)
　　*F16M 13/02*　(2006.01)
　　*F16M 13/00*　(2006.01)
　　*F16B 47/00*　(2006.01)
(52) U.S. Cl.
　　CPC ................ *F16M 13/00* (2013.01); *F16B 47/00* (2013.01); *F16M 13/022* (2013.01)
　　USPC ...................... 248/205.5; 248/309.3; 248/363; 248/683
(58) Field of Classification Search
　　CPC ...... F16B 47/00; F16M 13/00; F16M 13/002; F16M 13/02; B60R 2011/0056; B25B 11/005; B25B 11/007; A47G 1/17
　　USPC .......... 248/205.5, 205.8, 205.9, 206.2, 309.3, 248/362, 363, 683; 206/829; 224/559; 294/64.1

See application file for complete search history.

(56) References Cited

U.S. PATENT DOCUMENTS

| 4,852,926 | A * | 8/1989 | Littell ........................... 294/189 |
| 5,133,524 | A * | 7/1992 | Liu .............................. 248/205.8 |
| 6,234,435 | B1 * | 5/2001 | Yeh ............................. 248/205.5 |
| 6,478,271 | B1 * | 11/2002 | Mulholland ................ 248/205.8 |
| 7,338,020 | B2 * | 3/2008 | Magid ......................... 248/206.2 |
| 7,431,250 | B2 * | 10/2008 | Chen ........................... 248/205.5 |
| 7,458,841 | B2 * | 12/2008 | Kobayashi .................... 439/466 |
| 7,648,109 | B2 * | 1/2010 | Chen ........................... 248/205.5 |
| 7,708,245 | B2 * | 5/2010 | Woo ............................ 248/205.7 |
| 8,251,323 | B2 * | 8/2012 | Liu .............................. 248/206.2 |
| 8,387,932 | B2 * | 3/2013 | Takahashi et al. .......... 248/205.5 |

* cited by examiner

*Primary Examiner* — Todd M Epps

(57) ABSTRACT

The fixing device of this present invention provides a fixing device of a sucking disc type with smaller volume and simple structure, connects to a housing case of the portable electronic device by a locking screw, and comprises an elastic rubber plate and a resilient metal sheet. The elastic rubber plate has an air-hole. The resilient metal sheet also has a through-hole. The resilient metal sheet forms a tiny gap with the elastic rubber plate, when the fixing device is pressed onto the smooth surface of the metal or glass object, the air between said rubber plate and the smooth surface of the metal or glass object going through the through-hole into the tiny gap and going out of the elastic rubber plate via the air-hole.

7 Claims, 6 Drawing Sheets

US 8,894,026 B2

FIXING DEVICE

FIELD OF THE INVENTION

This present invention relates to the field of design, pattern, and assembly of a fixing device, particularly a fixing device of a sucking disc type having an elastic rubber plate that is capable of adsorbing onto a smooth surface of an object a metal or glass object.

DESCRIPTION OF THE PRIOR ART

Due to the rapid development of the electronic and information industries, the portable electronic devices have almost become indispensable to all of us, such as mobile phones, tablet personal computers, digital cameras, and global positioning system gadgets. Users often need some devices to support and fix their portable electronic devices somewhere such as in car or any smooth surfaces that user wants his device be fixed to.

As shown in FIGS. 1 and 2, a fixing device of prior art comprises a bottom assembly (11) and a support-holding stand (12) connected to the bottom assembly (11). The bottom assembly (11) comprises a sucking disc (111), a pressing cap (112), a pressing rod (113), and a forcing rod (114). The support-holding stand (12) comprises a post (121) and a gripper (122) to hold a portable electronic device (100). When the sucking disc (111) is pressed onto a smooth surface (102) of an object a metal or glass object, the air between the sucking disc (111) and the smooth surface (102) is forced outside of the space between them (111 and 102) and then make the space having a smaller pressure than atmospheric pressure, thus, the sucking disc (111) is further mounted onto the smooth surface (102) by means of the forcing rod (114), the pressing rod (113), and the pressing cap (112). However, the aforementioned fixing device is complicated in structure and operation.

SUMMARY OF THE INVENTION

This present invention provides a fixing device of a sucking disc type with smaller volume and simple structure which comprising an elastic rubber plate that is for sucking onto a smooth surface of solid object a metal or glass object. It is suitable to connect and fix a portable electronic device.

The fixing device of this present invention is connected to a housing case of the portable electronic device by a locking screw, and comprises an elastic rubber plate and a resilient metal sheet. The elastic rubber plate has an air-hole. The resilient metal sheet also has a through-hole. The resilient metal sheet forms a tiny gap with the elastic rubber plate, when the fixing device is pressed onto the smooth surface of the metal or glass object, the air between said rubber plate and the smooth surface of the metal or glass object going through the through-hole into the tiny gap and going out of the elastic rubber plate via the air-hole. Once the surface of the metal sheet is completely overlaid with the smooth surface of the object which the fixing device is mounted on, and the surface of the rubber plate is completely overlaid with the surface of robber plate, the air-hole on the elastic rubber plate and the through-hole on the resilient metal sheet are seized, therefore, the space between the fixing device and with the smooth surface of the object which the fixing device is mounted on becomes air-tight and approximate vacuum, and the fixing device is mounted on the surface by atmosphere pressure The resilient metal sheet functions as an on-off valve of the air passage in the fixing device of this present invention, as well as a supporting part to strengthen the loading capacity for the weight of the portable electronic device.

DETAILED DESCRIPTION OF THE PREFERRED EMBODIMENTS

Figure 1:
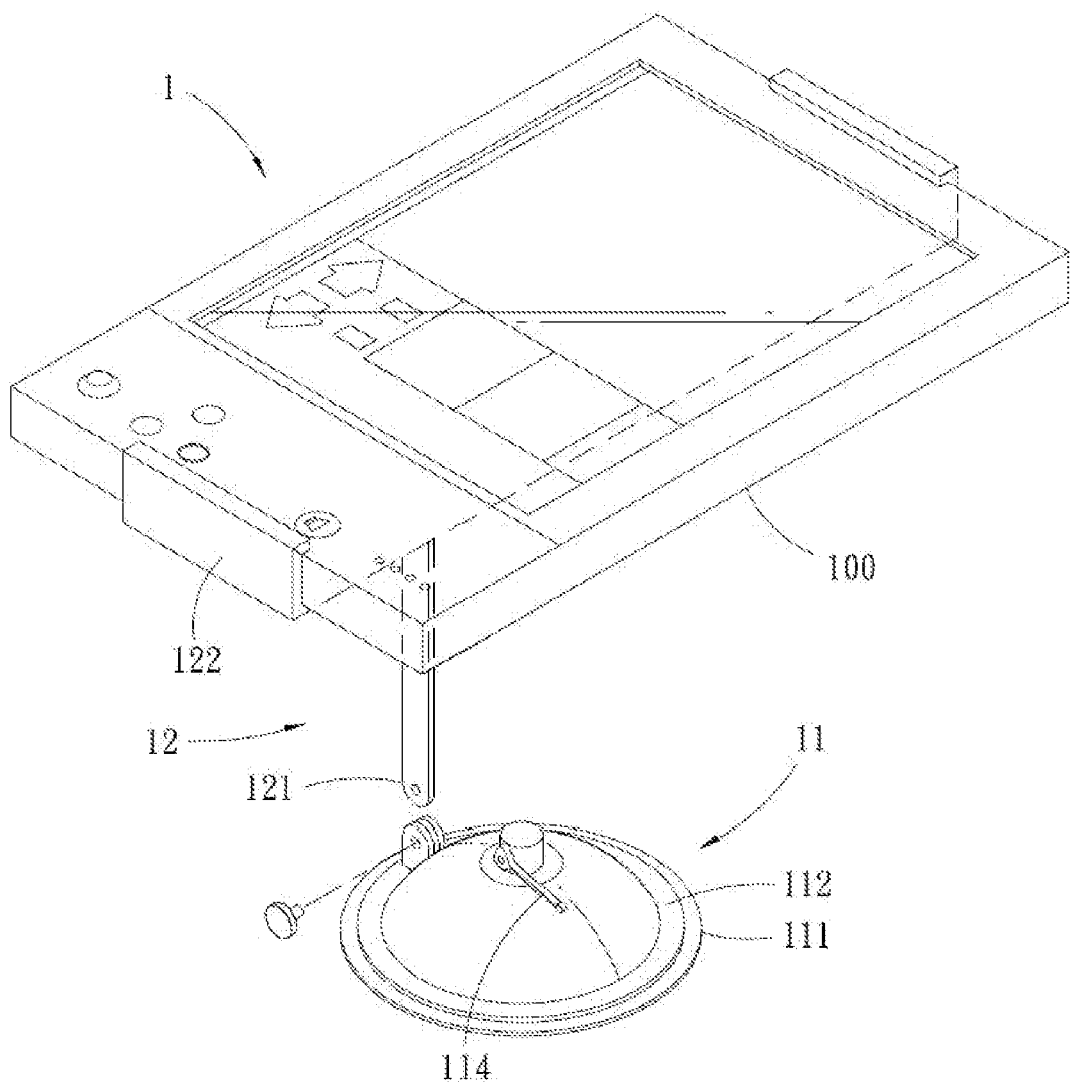
FIG. 1 is perspective view of a fixing device of prior art.
Figure 2:
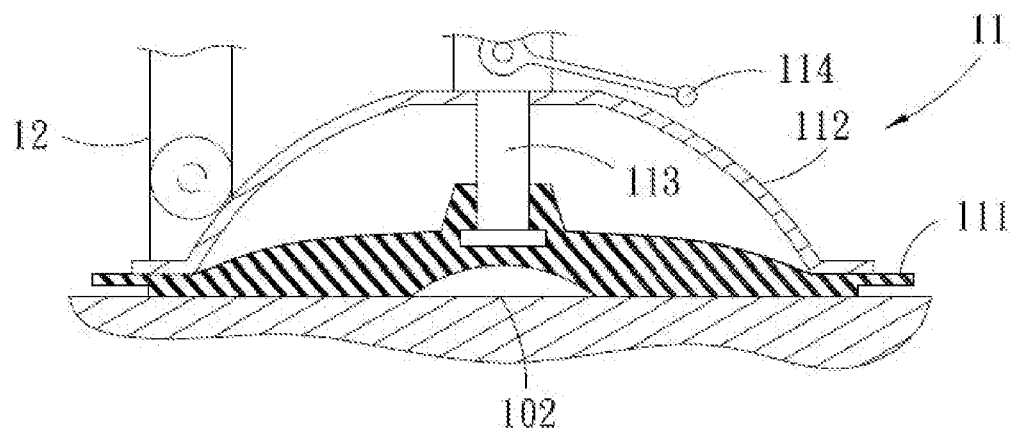
FIG. 2 is vertical cross-sectional view of the fixing device bottom of prior art.
Figure 3:
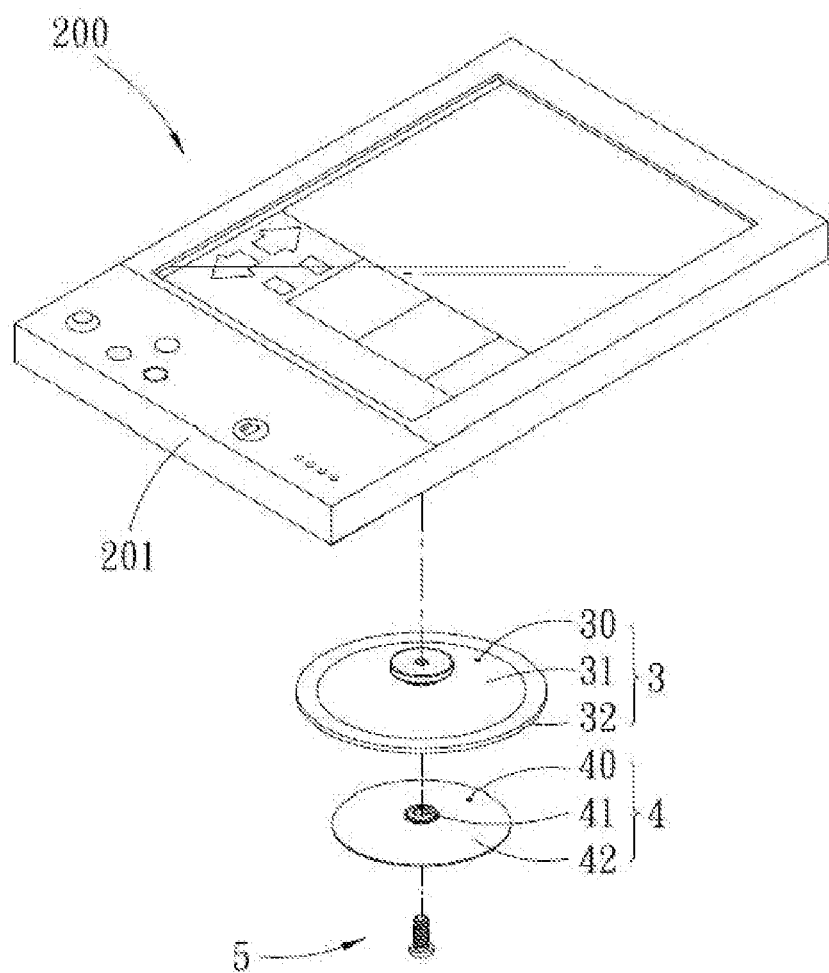
FIG. 3 is exploded view of the first embodiment of present invention.

This present invention in a first embodiment as shown in FIG. 3 discloses a fixing device that is connected to a housing case (201) of a portable electronic device (200), and fix the portable electronic device (200) onto a smooth surface (202) of an object made of metal or glass. The fixing device comprises an elastic rubber plate (3), a resilient metal sheet (4), and a connector (5).

Figure 4:
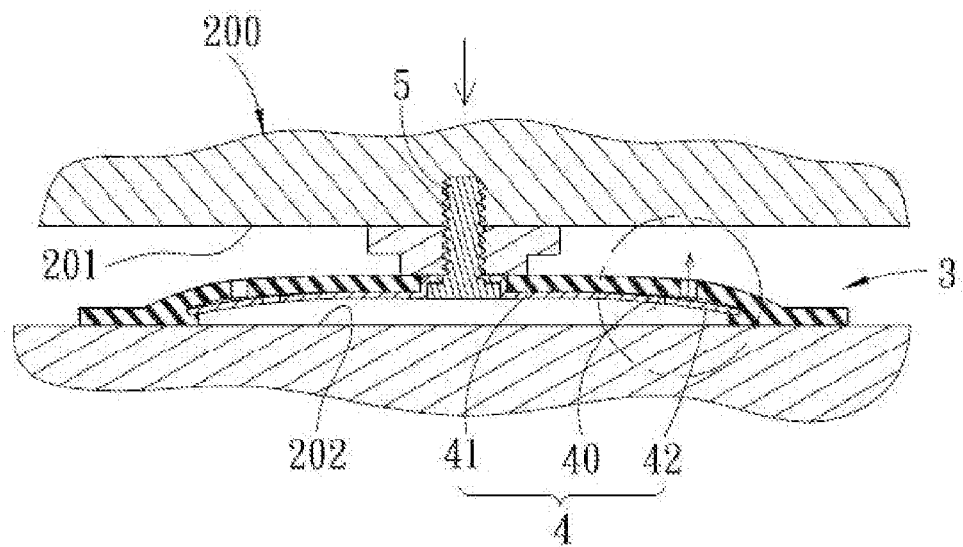
FIG. 4 is vertical cross-sectional view of unmounted fixing device in first embodiment of present invention.
Figure 4A:
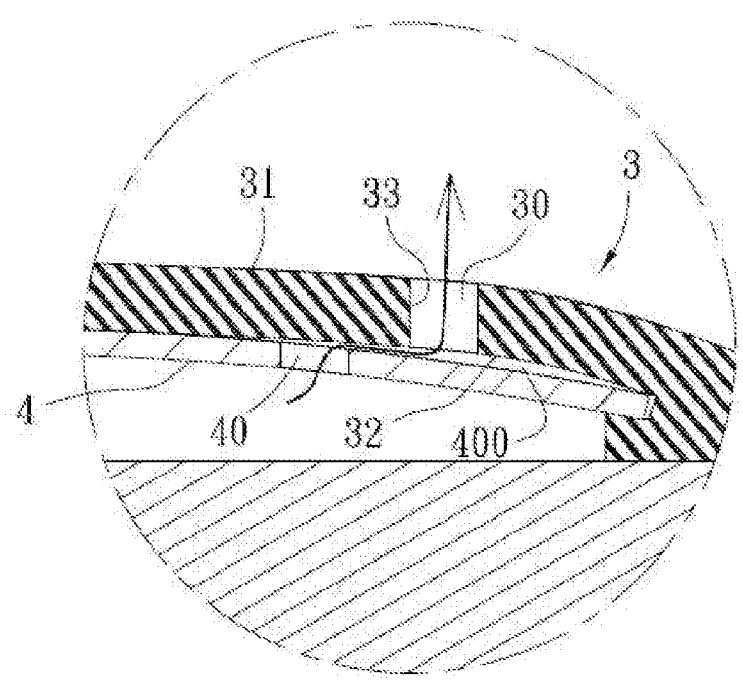
FIG. 4a is enlarged fragmentary section view of the air-hole (30) and the through-hole (40) shown in FIG. 4, the arrow and line indicate the direction of air passage.

The elastic rubber plate (3) has an outer surface (31), an inner surface (32), and an air-hole (30) perforating the elastic rubber plate (3) as shown in FIGS. 4 and 4a.

Figure 5:
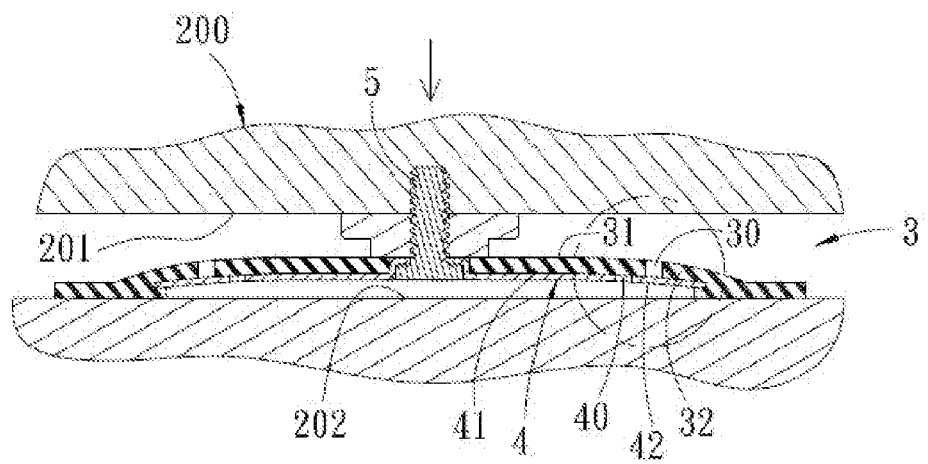
FIG. 5 is cross-sectional view of the mounted fixing device in first embodiment of present invention.
Figure 5A:
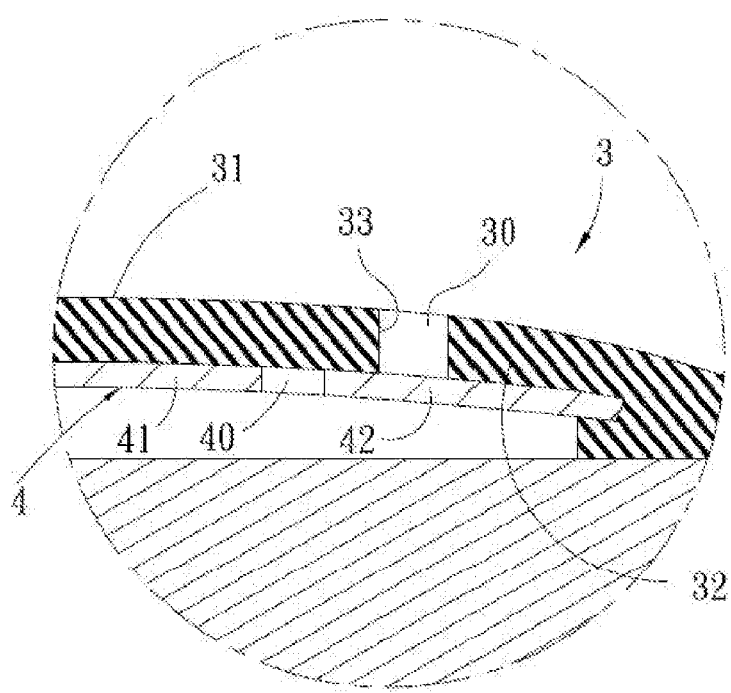
FIG. 5a is an enlarged fragmentary section view of the air-hole (30) and the through-hole (40) shown in FIG. 5.

The resilient metal sheet (4) has a through-hole (40), forms a tiny gap (400) with the inner surface (32) of the elastic rubber plate (3), forces air between the metal sheet (4) and the smooth surface (202) going through the through-hole (40) into the tiny gap (400) and going out of the elastic rubber plate (3) via the air-hole (30) when the fixing device is pressed onto the smooth surface (202) of the metal or glass object, and then closes the air-hole (30) and the through-hole (40) by pressing the elastic rubber plate (3) to the surface (202) as shown in FIGS. 5 and 5a.

More importantly as shown in FIGS. 4a and 5a, the air-hole (30) is not aligned to the through-hole (40). Thus, the through-hole (40) on the resilient metal sheet (4) and the air-hole (30) on elastic rubber plate (3) are seized by overlaying the inner surface (32) of elastic rubber plate (3) onto the resilient metal sheet (4) when the fixing device is pressed and adsorbed onto the smooth surface (202) of the metal or glass object.

Furthermore, the resilient metal sheet (4) has a middle portion (41) facing the inner surface (32) of the elastic rubber plate (3) and a periphery portion (42) having the through-hole (40). The resilient metal sheet (4) extends its edge to be embedded into a circular groove of the inner surface (32) of the elastic rubber plate (3) as shown in FIGS. 4a and 5a.

As mentioned in summary, the resilient metal sheet (4) functions as an on-off valve of the air passage in the fixing device of this present invention, as well as a supporting device to strengthen the loading capacity for the weight of the portable electronic device (200).

The connector (5) mounts the fixing device to the housing case (201) of the portable electronic device (200), and comprises a screw that penetrates a circle center of resilient metal sheet (4) and the elastic rubber plate (3), then screw fixed to the housing case (201) of the portable electronic device (200) as shown in FIGS. 3, 4, 5, 6.

Figure 6:
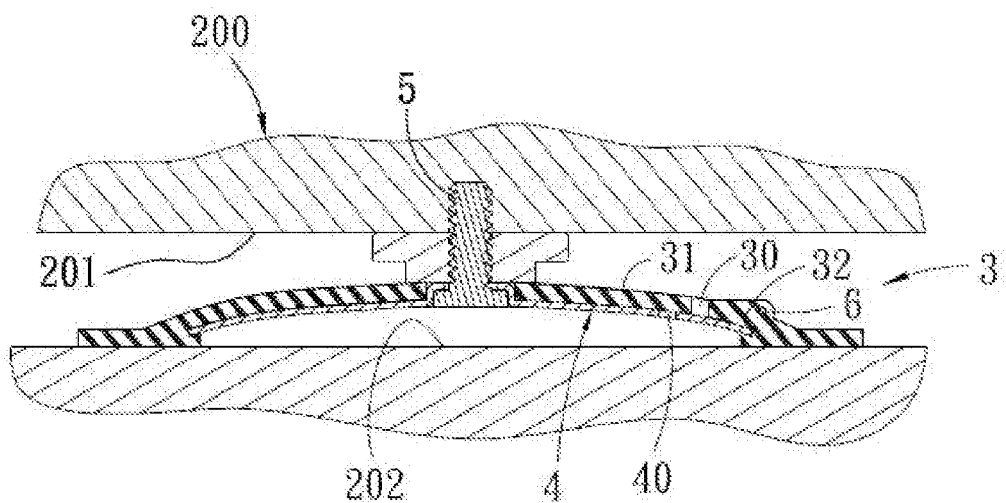
FIG. 6 is vertical cross section view of second embodiment of present invention.

Second embodiment of this present invention as shown in FIG. 6, further discloses a fixing device with an additional pulling part (6) that is located on the elastic rubber plate (3) and near the air-hole (30). The pulling part (6) is intended to pull the elastic rubber plate (3) apart from the resilient metal sheet (4) and consequently opens the air-hole (30) and the through-hole (40).

This present invention is disclosed but not limited by the described and illustrated practices. The embodiments described are only the best way of practicing of present invention, the modifications and variations according to the scope of present invention shall be deemed as infringement of what are claimed as following.

The invention claimed is:

1. A fixing device that is connected to a housing case (201) of a portable electronic device (200) and fix the portable electronic device (200) on a smooth surface (202) of a metal or glass object, comprises:

an elastic rubber plate (3) having an outer surface (31), an inner surface (32), and an air-hole (30) perforating the elastic rubber plate (3);

a resilient metal sheet (4) that has a through-hole (40), forms a tiny gap (400) with the inner surface (32) of the elastic rubber plate (3), forces air between the metal sheet (4) and the smooth surface (202) going through the through-hole (40) into the tiny gap (400) and going out of the elastic rubber plate (3) via the air-hole (30) when the fixing device is pressed onto the smooth surface (202), then the air-hole (30) and the through-hole (40) are seized by overlaying to the inner surface (32) of elastic rubber plate (3); and a connector (5) mounts the fixing device to the housing case (201) of the portable electronic device (200).

2. The fixing device of claim 1, wherein the air-hole (30) is not aligned to the through-hole (40).

3. The fixing device of claim 1, wherein the resilient metal sheet (4) has a middle portion (41) facing the inner surface (32) of the elastic rubber plate (3) and a periphery portion (42) having the through-hole (40).

4. The fixing device of claim 1, wherein the connector (5) comprises a screw that penetrates a circle center of resilient metal sheet (4) and the elastic rubber plate (3), then screw fixed to the housing case (201) of the portable electronic device (200).

5. The fixing device of claim 3, wherein the resilient metal sheet (4) extends its edge to be embedded into a circular groove of the inner surface (32) of the elastic rubber plate (3).

6. The fixing device of any one of claims 1-5 further has a pulling part (6) that is intended to pull the elastic rubber plate (3) apart from the resilient metal sheet (4) and consequently opens the air-hole (30) and the through-hole (40).

7. The fixing device of claim 6, wherein the pulling part (6) is located on the elastic rubber plate (3) and near the air-hole (30).

* * * * *